United States Patent Office 2,822,371
Patented Feb. 4, 1958

2,822,371

BODIED 12-KETO OCTADECENOIC ACID GLYCERIDES

Joseph Nichols, Princeton, N. J., assignor to Ethicon, Inc., a corporation of New Jersey No Drawing. Application October 25, 1954
Serial No. 464,647

14 Claims. (Cl. 260—406)

This invention relates to the bodying of ketonized castor oil, and more particularly relates to the bodying of oxidized castor oil in which the hydroxy groups of glycerol ricinoleates thereof have been converted to keto groups by oxidative means.

Castor oil is a tri-glyceride oil in which 88 to 93 percent of the fatty acid component is ricinoleic acid and 7 to 12 percent consists of oleic, stearic, linoleic, and di-hydroxy stearic acid. The ricinoleic acid component has a beta-gamma unsaturated alcohol group. Co-pending application Serial Number 443,165, filed July 13, 1954, describes a method for the ketonization of castor oil by oxidation of the glycerol ricinoleates by means of an aluminum secondary or tertiary alkoxide in the presence of a hydrogen acceptor such as a low molecular weight ketone, the oxidation being conducted in an organic solvent. The oxidation results in the production of a ketonized castor oil in which the fatty acid moities contain a double bond positioned alpha-beta or beta-gamma with respect to the keto group.

The bodying of drying oils by heat or air-blowing has been practiced for some time to increase viscosity and shorten the drying time. When a drying oil is heated or when air is blown through a drying oil, the oil becomes gradually more viscous and its gel-time decreases, gel-time being the time required for a drying oil to gel when heated at 300° C. A drying oil which can be bodied in a controlled manner, especially with a minimum of discoloration resulting, is adaptable for use in the varnish and coating industry.

It is an object of this invention to provide a bodied, ketonized castor oil, and more particularly, to provide a bodied, ketonized castor oil in which the hydroxy groups of the glycerol ricinoleates present in the castor oil have been converted to keto groups by oxidative means.

It is another object of this invention to provide a bodied, ketonized castor oil having no substantial discoloration.

The objects of this invention are accomplished and a bodied, ketonized castor oil provided by heating or blowing air through a castor oil in which the hydroxy groups of the glycerol ricinoleates thereof have been converted to keto groups by oxidative means and more specifically, by oxidation in an organic solvent with an aluminum secondary or tertiary alkoxide in the presence of a hydrogen acceptor such as a low molecular weight ketone.

In general, the method by which castor oil is oxidized to convert the hydroxy groups of glycerol ricinoleates present in the castor oil to keto groups is as follows:

A quantity of castor oil is dissolved in a large excess of an organic solvent which is inert with respect to the oxidizing agent, and preferably an aromatic hydrocarbon such as xylene, toluene, or benzene and an excess of a low molecular weight aliphatic ketone such as acetone, methyl ethyl ketone, or cyclohexanone, precautions being taken to ensure that the solution is anhydrous. An excess of aluminum secondary or tertiary alkoxide in which the alkyl group is of low molecular weight, and preferably aluminum isopropoxide, or aluminum tertiary butoxide, is dissolved in an anhydrous organic solvent, and preferably an aromatic hydrocarbon such as xylene, toluene, or benzene and added to the solution of the acid. The reaction mixture is heated and refluxed, and precautions are taken to exclude moisture during heating and refluxing. Refluxing the reaction mixture for a period of time of from five to about fifteen minutes at a temperature not substantially above 115° C. results in a ketonized castor oil in which the fatty acid moities contain a double bond positioned predominantly in the beta-gamma position with respect to the keto group. If the time of refluxing is less than about five minutes, a substantial amount of unoxidized castor oil is recovered unchanged; and if the refluxing time exceeds about fifteen minutes, a ketonized oil containing a substantial amount of glycerides of 12-keto-10-octadecenoic acid as well as glycerides of 12-keto oleic acid is obtained. Refluxing the reaction mixture for a period of time substantially longer than fifteen minutes results in still more ketonized castor oil in which the double bond of the fatty acid moities has been shifted to the alpha-beta position with respect to the keto group. As the time of refluxing is increased the amount of shifting of the double bond is increased and shifting of the double bond is still further increased by elevating the reflux temperature. Ketonized castor oil in which the double bond of the fatty acid moities is predominantly positioned alpha-beta with respect to the keto group is obtained by refluxing of the reaction mixture for at least about 45 minutes when the reflux temperature is not substantially above 115° C. For the preparation of ketonized castor oil in which the double bond of the fatty acid moities is predominantly positioned beta-gamma with respect to the keto group, it is preferred that the reflux temperature be 110°–115° C. and the time of refluxing ten to fifteen minutes. And for the preparation of ketonized castor oil in which the double bond of the fatty acid moities is substantially completely positioned alpha-beta with respect to the keto group, it is preferred that the reflux temperature be 126°–130° C. and the time of refluxing one to six hours.

At the end of the reflux period, the reaction mixture is cooled and washed several times with dilute mineral acid. The washings are combined, extracted with an organic solvent, and preferably an aromatic hydrocarbon such as xylene, benzene, or toluene, and the solution is washed with water until the pH of the wash water is approximately neutral. The solution of the reaction product is dried over a drying agent, the drying agent is removed, and the organic solvent is removed by distillation under reduced pressure. The residual oil may be further purified by washing with aqueous ethanol.

A bodied oil of any desired viscosity may be obtained by varying the duration and temperature of the heating period to which a ketonized oil is subjected. The time of heating at 300° C. required to convert ketonized oils to a friable solid gel is about three hours for an oil in which the double bond of the fatty acid moities is positioned beta-gamma with respect to the keto group and about one hour to 1¼ hours for an oil in which the double bond of the fatty acid moities is positioned alpha-beta with respect to the keto group.

Bodying of the ketonized oil by passing a stream of air through the oil at room temperature results in a gradual increase in the viscosity and refractive index over a period of about 18 days; only a slight increase in the viscosity and refractive index occurs upon passing a stream of air through the oil for a longer time. Bodying of the ketonized oil by passing a stream of air through the oil while the oil is maintained at an elevated temperature results in an increasingly viscous material which eventually becomes a friable gel. The color of the ketonized oil does not change noticeably during air-blowing even at an elevated temperature. Keto and acid numbers are increased by passing air through a ketonized oil and, in the case of air-blowing, the oxygen content of the oil increases from about fifteen percent to about twenty-three percent upon air-blowing for eleven days. The viscosity of the air-blown, ketonized oil increases from 1.10 poises at 25° C. to about 4.35 poises at 25° C. after air-blowing for eleven days at room temperature. Keto numbers are decreased by heat-bodying of ketonized oils.

For the purpose of illustration, the following examples of the bodying of ketonized castor oil are set forth.

Example I

Ketonized castor oil was prepared in the following manner:

180 grams of castor oil, 1800 milliliters of toluene and 900 milliliters of cyclohexanone in a 5-liter, 3-neck flask fitted with a mechanical stirrer, thermometer, Dean-Stark water trap, and reflux condenser, were heated to reflux and maintained at a reflux until water was no longer evolved. A solution of 180 grams of aluminum tertiary butoxide dissolved in 900 milliliters of anhydrous toluene was rapidly added to the solution of castor oil in toluene and cyclohexanone. The reaction mixture was refluxed for fifteen minutes and then rapidly cooled with an ice-water mixture. The cooled reaction mixture was successively washed with five 500 milliliter portions of ten percent sulphuric acid, and then washed with water until the pH was approximately 7.0, and dried over anhydrous sodium sulfate. The organic solvents were removed from the reaction mixture by distillation at a pressure of 0.3 millimeter of mercury. When the temperature of the reaction product reached 65° C. the distillation was discontinued. The residual oil was dissolved in 700 milliliters of ethanol and precipitated by the addition of 180 milliliters of water. The precipitation was repeated an additional four times, using the same amounts of ethanol and water, and the final precipitated oil was dissolved in petroleum ether and dried over anhydrous sodium sulfate. The petroleum ether was removed by distillation at a pressure of 0.3 millimeter of mercury and, when the temperature of the residual liquid reached 65° C., distillation was discontinued. 140 grams of light yellow oil having a viscosity of 1.10 poises at 25° C. were obtained. The oil had an acid number of 0.40, 86.4 percent of the theoretical number of keto groups for glycerol tri-12-keto oleate, and a refractive index at 27° C. of 1.4763.

A stream of air was passed for fifty days through 50 grams of the ketonized oil, the oil being maintained at room temperature. The refractive index at 25° C., acid number, and the number of keto groups expressed in percent of theoretical for glycerol tri-12-keto oleate, for the initial oil and for air-blown oil at intervals up to fifty days are given in the table below:

| Time, Days | Refractive Index | Acid No. | Keto Groups |
| --- | --- | --- | --- |
| 0 | 1.4772 | 0.00 | 95 |
| 3 | 1.4776 | | |
| 7 | 1.4786 | 1.03 | 106 |
| 11 | 1.4805 | 5.20 | 122 |
| 13 | 1.4814 | | |
| 15 | 1.4832 | | |
| 20 | 1.4843 | | |
| 50 | 1.4842 | 79.5 | |

The viscosity of the oil after eleven days of air-blowing at room temperature was 4.35 poises at 25° C.

Example II

Ketonized castor oil was prepared as follows:

180 grams of castor oil, 1800 milliliters of xylene, and 900 milliliters of cyclohexanone in a 5-liter, 3-neck flask fitted with a mechanical stirrer, thermometer, Dean-Stark water trap and reflux condenser were heated to reflux and maintained at a reflux until water was no longer evolved. A hot solution of 180 grams of aluminum tertiary butoxide dissolved in 900 milliliters of xylene was slowly added to the hot solution of castor oil in xylene and cyclohexanone. The reaction mixture was refluxed for one hour and then cooled. The cooled reaction mixture was successively washed with five 500 milliliter portions of ten percent sulphuric acid and then washed with water until the pH of the wash water was 7, and dried over anhydrous sodium sulfate. The organic solvents were removed from the reaction mixture by distillation at a pressure of 0.3 millimeter of mercury. When the temperature of the residual oil reached 185° C. the distillation was discontinued. The residual oil was dissolved in 450 milliliters of absolute ethanol, filtered, cooled in an ice bath for five hours and filtered. The yellow crystalline solid obtained was recrystallized from 150 milliliters of absolute ethanol. Fifty grams of glycerol tri-12-keto-10-octadecenoate were obtained. The crystalline acid had a melting point of 46–47° C., an acid number of 0.231, and 95.2 percent of the theoretical number of keto groups for glycerol tri-12-keto-10-octadecenoate. The crystalline acid was recrystallized five times from absolute ethanol and then had a melting point of 49–50° C., an acid number of 0.0, and 100 percent of the theoretical number of keto groups for glycerol tri-12-keto-10-octadecenoate.

The crystalline acid was heated at 165° C. for five hours and the light, orange colored bodied oil obtained had a viscosity of 10 poises at 25° C., an acid number of 7.41, a refractive index at 27.5° C. of 1.4808, and 81.3 percent of the theoretical number of keto groups for glycerol tri-12-keto-10-octadecenoate.

Example III

Ketonized castor oil was prepared as follows:

720 grams of castor oil, 7200 ml. of xylene, and 3600 ml. of redistilled cyclohexanone were refluxed with stirring until water was no longer evolved. A hot solution of 720 grams of aluminum tertiary butoxide in 3600 ml. of xylene was slowly added to the hot castor oil solution. After addition was complete, the reaction mixture was refluxed at 137° C. for one hour, cooled and washed five times with 1500 ml. portions of cold ten percent aqueous sulphuric acid solution and then five times with 1500 ml. portions of cold water. The final washing was neutral. The castor oil solution was dried over anhydrous sodium sulfate and the solvents were removed by distillation at a pressure of 0.3 millimeter of mercury, the pot temperature not exceeding 205° C. during the removal of the solvents. Five hundred grams of clear, orange oil were obtained and the oil had an acid number of 27.6, 93.0 percent of the theoretical number of keto groups for glycerol tri-12-keto-oleate and a viscosity of 2.60 poises at 25° C.

The ketonized oil was heated at 200° C. for 24 hours, purified nitrogen being bubbled through the oil during the heating period. The viscosity, acid number, and keto number of the oil were determined periodically during the heating period and the results of the determinations are given below in tabular form, the keto number being expressed in percent of theoretical for glycerol tri-12-keto-oleate:

| Time (Hours) | Viscosity (Poises at 25° C.) | Acid No. (Mg. KOH/gram) | Keto No. (Percent of Theory) |
| --- | --- | --- | --- |
| 0 | 2.6 | 27.6 | 93.0 |
| 6 | 3.1 | 25.1 | |
| 10.5 | 5.7 | 22.9 | 76.8 |
| 13.7 | 6.2 | 21.8 | 68.8 |
| 19.8 | 9.5 | 19.6 | 61.7 |
| 24.0 | 15.2 | 18.4 | 55.8 |

Example IV

Fifty grams of ketonized castor oil, prepared according to the procedure of Example I, were heated at 200° C. for twenty-three hours, purified nitrogen being bubbled through the oil during the heating period. The viscosity, acid number, and keto number of the oil was determined periodically during the heating period and the results of the determinations are given below in tabular form, the keto number being expressed in percent of theoretical for glycerol tri-12-keto-oleate:

| Time (Hours) | Viscosity (Poises at 25° C.) | Acid No. (Mg. KOH/gram) | Keto No. (Percent of Theory) |
|---|---|---|---|
| 4 | 3.45 | 1.74 | 83.2 |
| 7 | 4.85 | 2.16 | 82.2 |
| 11 | 8.80 | 2.46 | 72.6 |
| 23 | 26.0 | 2.67 | 45.1 |

Bodied oils prepared from ketonized castor oils containing predominantly glycerides of 12-keto-10-octadecenoic acid, glycerides of 12-keto oleic acid or mixtures thereof are useful as protective coatings or may be used with fillers or other polymeric substance as protective coatings. The bodied oils are compatible with polyvinyl chloride films and may be used as plasticizers for polyvinyl chloride. The bodied oils are compatible with many types of polymers and are suitable for use as plasticizers. Because the bodied oils are non-toxic and non-irritating, they have a particular application as plasticizers for synthetic films and polymers which are to be used in contact with body tissues.

Since certain features in connection with the process of this invention for the bodying of ketonized castor oil may be varied without departing from the scope of the invention, it is intended that all material contained in the description is to be interpreted as illustrative and not by way of limitation.

This application is a continuation-in-part of my application Serial No. 443,165, filed July 13, 1954.

What is claimed is:

1. A bodied oil in which the oil comprises essentially a triglyceride selected from the class consisting of triglycerides of 12-keto-oleic acid, glycerides of 12-keto-10-octadecenoic acid, and mixtures thereof, said oil having the property of bodying as a result of chemical interaction of an unsaturated carbonyl moiety.

2. A bodied oil in which the oil comprises essentially a triglyceride of 12-keto-oleic acid, said oil having the property of bodying as a result of chemical interaction of an unsaturated carbonyl moiety.

3. A bodied oil in which the oil comprises essentially a triglyceride of 12-keto-10-octadecenoic acid, said oil having the property of bodying as a result of chemical interaction of an unsaturated carbonyl moiety.

4. A bodied oil in which the oil comprises essentially a mixture of triglycerides of 12-keto-oleic acid and 12-keto-10-octadecenoic acid, said oil having the property of bodying as a result of chemical interaction of an unsaturated carbonyl moiety.

5. A heat bodied oil in which the oil comprises essentially a triglyceride selected from the class consisting of triglycerides of 12-keto-oleic acid, glycerides of 12-keto-10-octadecenoic acid, and mixtures thereof, said oil having the property of bodying as a result of chemical interaction of an unsaturated carbonyl moiety.

6. A heat bodied oil in which the oil comprises essentially a triglyceride of 12-keto-oleic acid, said oil having the property of bodying as a result of chemical interaction of an unsaturated carbonyl moiety.

7. A heat bodied oil in which the oil comprises essentially a triglyceride of 12-keto-10-octadecenoic acid, said oil having the property of bodying as a result of chemical interaction of an unsaturated carbonyl moiety.

8. A heat bodied oil in which the oil comprises essentially a mixture of triglycerides of 12-keto-oleic acid and 12-keto-10-octadecenoic acid, said oil having the property of bodying as a result of chemical interaction of an unsaturated carbonyl moiety.

9. An air-blown bodied oil in which the oil comprises essentially a triglyceride selected from the class consisting of triglycerides of 12-keto-oleic acid, glycerides of 12-keto-10-octadecenoic acid, and mixtures thereof, said oil having the property of bodying as a result of chemical interaction of an unsaturated carbonyl moiety.

10. An air-blown bodied oil in which the oil comprises essentially a triglyceride of 12-keto-oleic acid, said oil having the property of bodying as a result of chemical interaction of an unsaturated carbonyl moiety.

11. An air-blown bodied oil in which the oil comprises essentially a triglyceride of 12-keto-10-octadecenoic acid, said oil having the property of bodying as a result of chemical interaction of an unsaturated carbonyl moiety.

12. An air-blown bodied oil in which the oil comprises essentially a mixture of triglycerides of 12-keto-oleic acid and 12-keto-10-octadecenoic acid, said oil having the property of bodying as a result of chemical interaction of an unsaturated carbonyl moiety.

13. A bodied oil prepared by heating at 300° C. for about three hours an oil which comprises essentially a triglyceride of 12-keto-oleic acid, said oil having the property of bodying as a result of chemical interaction of an unsaturated carbonyl moiety.

14. A bodied oil prepared by heating at 300° C. for about one to one and one-quarter hours an oil which comprises essentially a triglyceride of 12-keto-10-octadecenoic acid, said oil having the property of bodying as a result of chemical interaction of an unsaturated carbonyl moiety.

References Cited in the file of this patent

UNITED STATES PATENTS

| | | |
|---|---|---|
| 2,388,257 | Eisenschiml | Nov. 6, 1945 |
| 2,547,760 | Konen et al. | Apr. 3, 1951 |
| 2,623,888 | Nichols | Dec. 30, 1952 |

OTHER REFERENCES

Markley: Fatty Acids (1947), pages 41 and 42.

U. S. DEPARTMENT OF COMMERCE
PATENT OFFICE

CERTIFICATE OF CORRECTION

Patent No. 2,822,371                                  February 4, 1958

Joseph Nichols

It is hereby certified that error appears in the printed specification of the above numbered patent requiring correction and that the said Letters Patent should read as corrected below.

Column 5, line 45, second occurrence, and column 6, lines 3 and 23, for "glycerides", in each occurrence, read -- triglycerides --.

Signed and sealed this 25th day of March 1958.

(SEAL)
Attest:
KARL H. AXLINE
Attesting Officer

ROBERT C. WATSON
Commissioner of Patents